Oct. 23, 1956  R. H. McDANIEL  2,768,281
WELDING JIG
Filed March 30, 1953  5 Sheets-Sheet 1
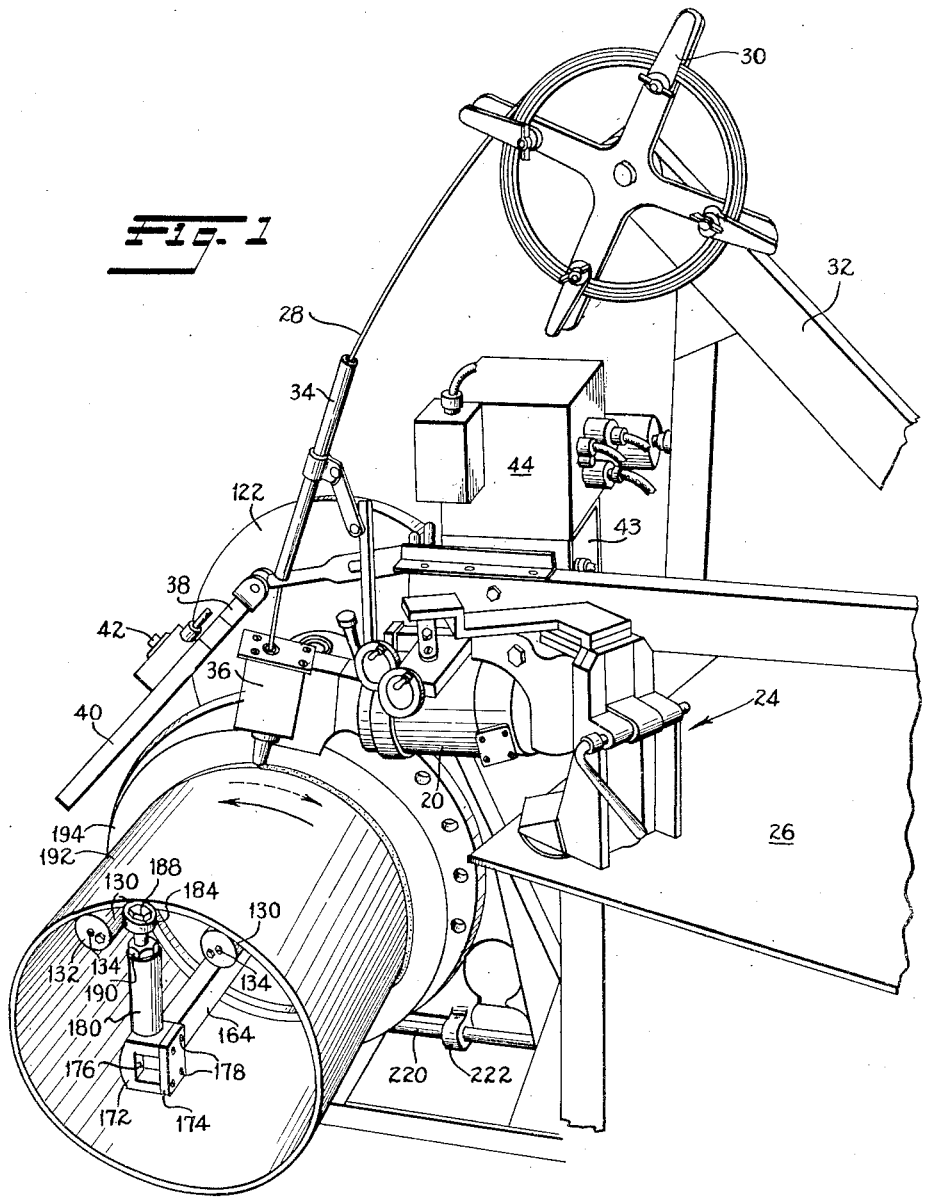
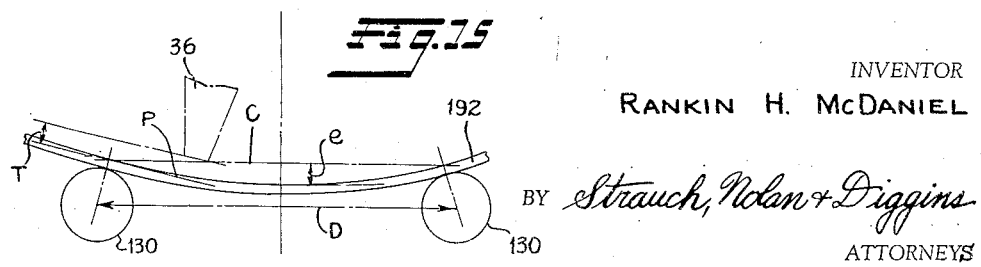
INVENTOR
RANKIN H. McDANIEL
BY Strauch, Nolan & Diggins
ATTORNEYS Oct. 23, 1956 R. H. McDANIEL 2,768,281
WELDING JIG
Filed March 30, 1953 5 Sheets-Sheet 2
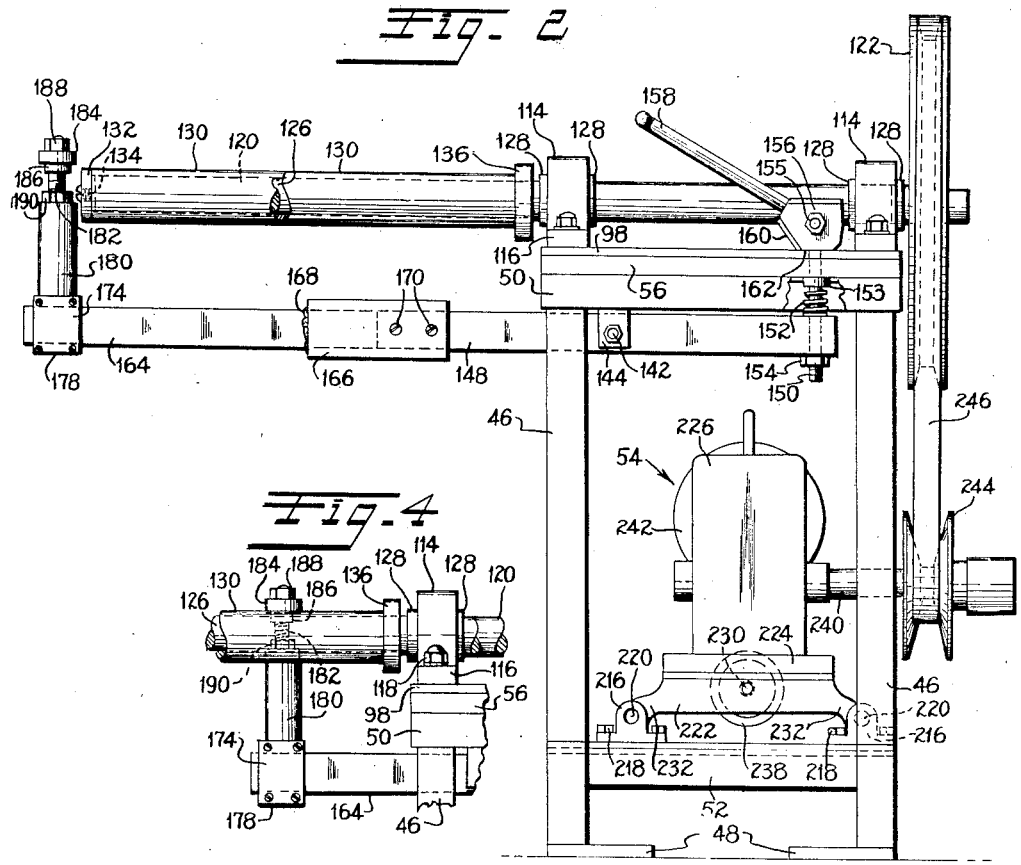
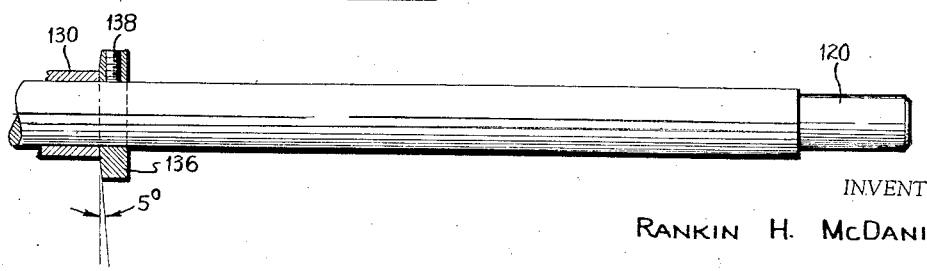
INVENTOR
RANKIN H. McDANIEL
BY Strauch, Nolan & Diggins
ATTORNEYS Oct. 23, 1956  R. H. McDANIEL  2,768,281
WELDING JIG
Filed March 30, 1953  5 Sheets-Sheet 3
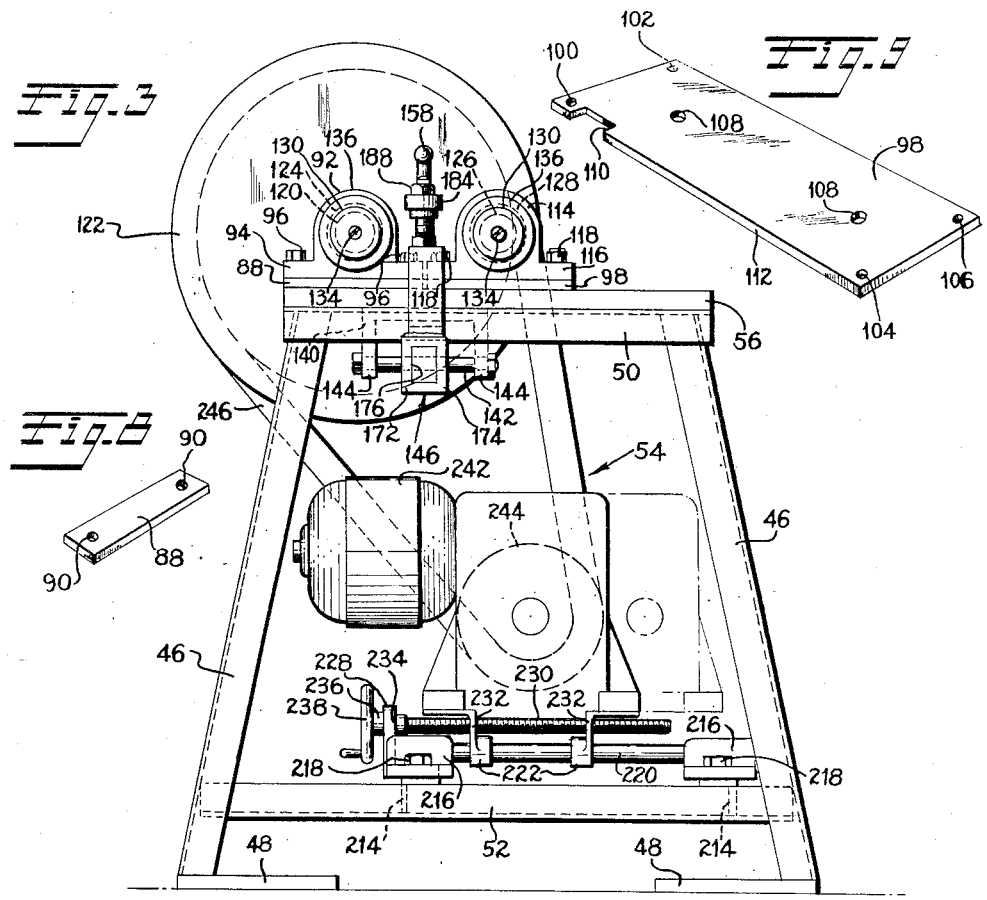
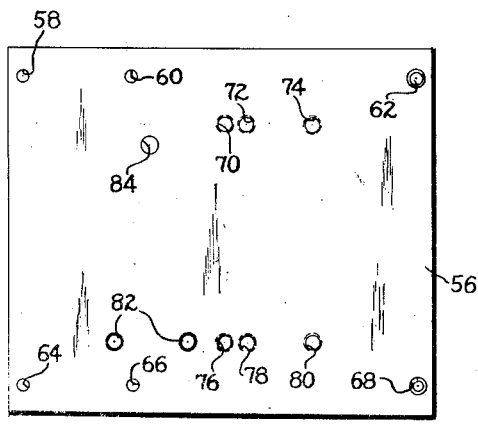
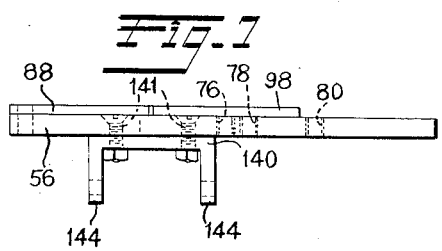
INVENTOR
RANKIN H. McDANIEL
BY *Strauch, Nolan & Diggins*
ATTORNEYS

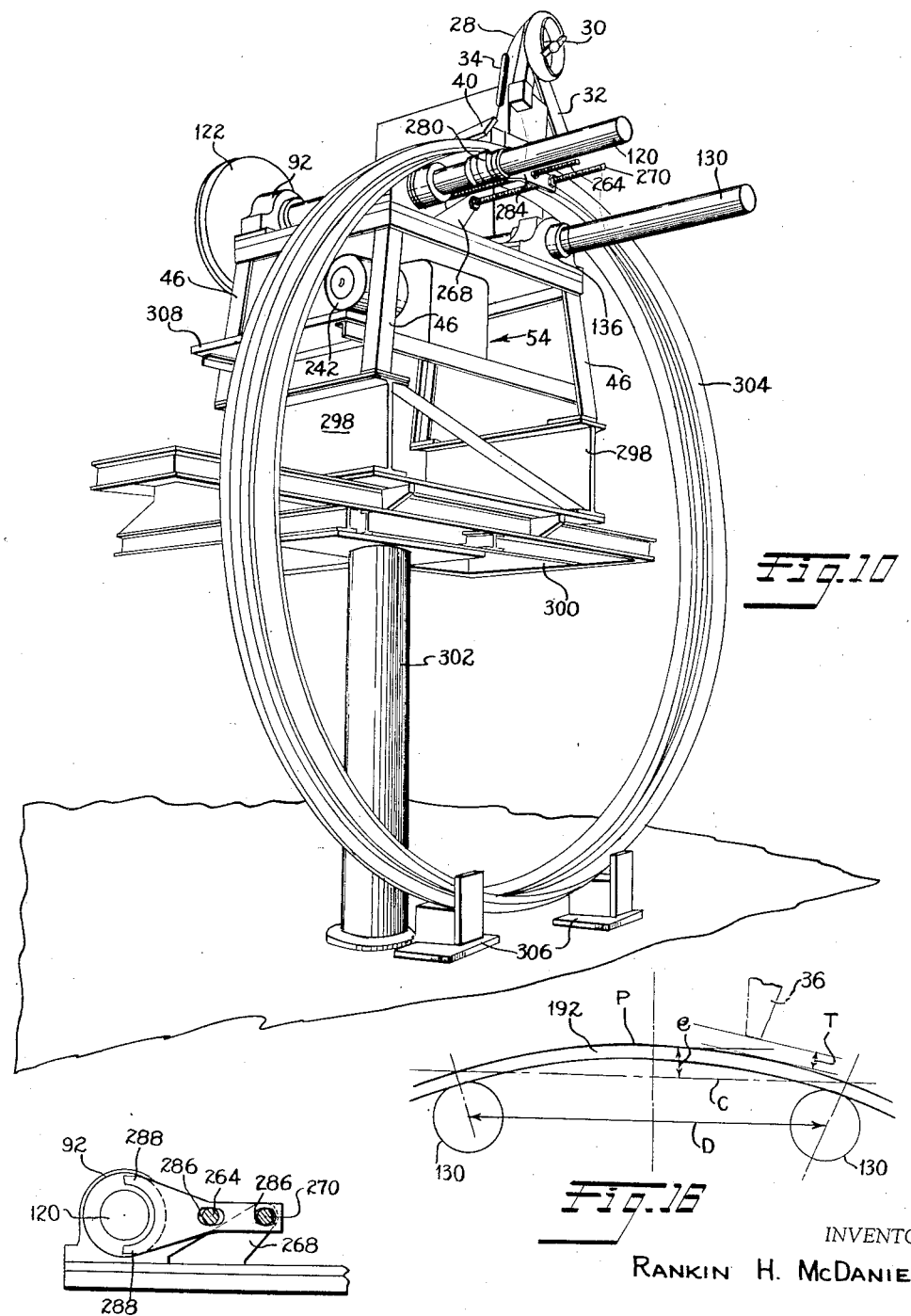

Oct. 23, 1956 R. H. McDANIEL 2,768,281
WELDING JIG
Filed March 30, 1953 5 Sheets-Sheet 5
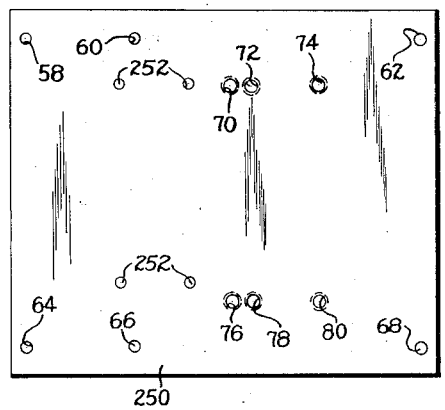
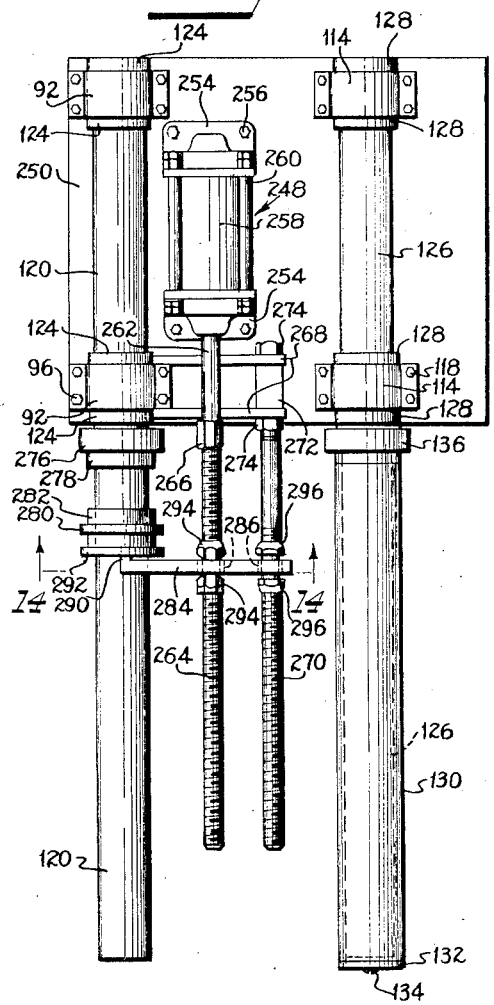
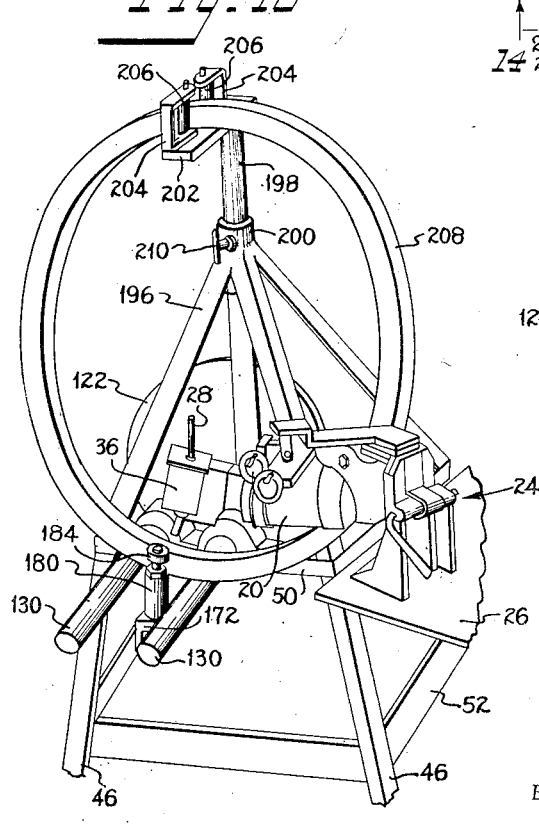
INVENTOR
RANKIN H. McDANIEL
BY Strauch, Nolan + Diggins
ATTORNEYS United States Patent Office 2,768,281
Patented Oct. 23, 1956

2,768,281

WELDING JIG

Rankin H. McDaniel, Vista, Calif., assignor to Solar Aircraft Company, San Diego, Calif., a corporation of California Application March 30, 1953, Serial No. 345,541

20 Claims. (Cl. 219—130)

This invention relates to work supports or jigs and more particularly to a universal jig for supporting cylindrical members for circumferential internal or external welding operations.

In the circumferential seam welding of hollow cylindrical members, such as short pipe sections, or narrow thin walled flexible members such as bellows and bellows fittings, it is necessary to support the members to be welded in a manner to assure proper relative relation to the area being welded to the welding tool in order to effect an efficient weld. Solution of this problem is not simple as will be apparent when it is considered that provision must be made for handling articles ranging in diameter from a few inches to as much as ten feet made under conditions which result in an out of roundness of a substantial degree. In such welding there are many factors to be considered, which if not properly controlled, may materially adversely affect the forming of an efficient weld. For example, in welding it has been found in practice that tolerance limits on the gap between the electrode and the workpiece for depositing an efficient weld is in a very narrow range, on the order of plus or minus $\frac{1}{64}$ of an inch. It is, therefore, obvious with this limited tolerance range that the relative mounting of welder and workpiece must be exacting. However, in the welding of circumferential members, the relative mounting of the welder and workpiece is materially affected to ovality or out of roundness in the cylindrical workpiece regardless of how exacting the gap tolerance has been adhered to at any localized point between the workpiece and welder. Quantity production methods do not permit of the most exacting tolerances on such cylindrical members but allow a relatively wide range in ovality of the member; for example in a 72 inch diameter hollow cylindrical member an ovality tolerance on the order of $\frac{9}{16}$ of an inch full indicator reading is allowed. It is, therefore, obvious that, if such a workpiece is mounted for a circumferential seam weld by conventional means heretofore known in the art, such as fixed center jigs wherein the workpiece is rotated about its own center past the welding head, or cradling roller supports diametrically opposed across the worpiece from the welding head, it is practically, if not completely impossible, to maintain the welding gap within the tolerances required for efficient welding. This condition is even further aggravated as the diametrical size of the workpieces increase and the production of an efficient weld is further impeded by the speed at which the work and welding head are moved relative to one another and by the tendency of the puddle of welding metal to run by gravity along the seam to be welded away from the area being subjected to welding heat.

The foregoing problems have not been satisfactorily solved by prior art devices and the prior art devices known to applicant are either not adaptable for both internal or external circumferential welds regardless of size of the workpiece, are extremely expensive and necessitate practically complete revision of the structure to adapt it from one welding operation to a totally different welding operation.

The novel welding jig of this invention is relatively simple, compact, and portable and uniquely provides a solution to the foregoing problems which heretofore have resulted in imperfect circumferential welds. This novel jig finds particular utility in circumferential welding utilizing the consumable electrode arc welding method and it is thereby possible for the conditions of circumferential welding to closely approximate the ideal conditions existent in flat plate welding with the consequent result that efficient welds are attainable. The conditions are possible in this novel jig due to the provision of novel support means which selectively engages either the inner or outer periphery of the hollow cylindrical workpiece immediately opposite or adjacent the welding head which is positioned for forming the weld on the other exposed periphery. As a result the workpiece is essentially surface supported rather than supported on its centers or on its diameter. The support means are novelly adjustable so that the arc of the workpiece between the supports is maintained at the minimum curvature or as flat as possible commensurate with stability of the workpiece on the supports. The support means are driven in a direction to impart progressive movement of the workpiece past the welding head counter to the gravity flow forces of the puddle to effect high quality circumferential welding. As a result, with the use of this novel jig the workpiece is locally controlled in the vicinity of the welding head so the effect is one of welding a continuous substantially flat surface and the effects of wide tolerance ranges of ovality in the workpiece which are present when employing jigs that center or diametrically mount the workpiece are effectively nullified. This invention further provides a novel microadjustment of the drive means which permits the jig to selectively rotate various sized workpieces at the speeds most suitable for efficient welding.

It is, therefore, a primary object of this invention to provide a novel universal jig for supporting cylindrical members for either internal or external welding operations.

Another object of this invention is to provide a novel universal jig for supporting cylindrical members in substantially precise relation to a welding head for efficient circumferential welding in either internal or external welding operations.

A further object of this invention is to provide a novel universal jig for rotatably supporting cylindrical members in a novel manner so the detrimental effects of ovality of the member on the welding gap between the welding unit and member is nullified in either internal or external welding operations.

Still another object of this invention is to provide a universal jig for rotatably supporting cylindrical members for external or internal welding operations having novel variable speed drive means.

Yet another object of this invention is to provide a universal portable jig for supporting cylindrical members immediately adjacent the area being welded to effectively prevent variations of welding conditions in either external or internal welding operations.

Another object of this invention is to provide a universal welding jig for progressive internal or external circumferential welding operations of cylindrical members having novel support means assuring maximum stability and control of said members throughout the welding operation.

Still another object of this invention is to provide a universal jig for supporting cylindrical members in internal or external welding operations with novel adjustable driving supports which support the cylindrical members with maximum stability in proper unvarying relation to a welding unit in a manner substantially approximating flat plate welding conditions.

A further object of this invention is to provide a compact integrated welding jig having adjustable variable speed driving supports for transversely supporting cylindrical members either externally or internally in proper unvarying relation to a welding unit with maximum stability and having novel adjustable axial support and guide means for maintaining the members on the driving supports in proper transverse relation to said welding unit.

Still a further object of this invention is to provide a novel compact portable jig for supporting cylindrical members for internal or external welding operations that is inexpensively manufactured and simple to operate.

These and other objects will appear from the following description and appended claims when read in connection with the attached drawing, wherein:

Figure 1 is a perspective view of the preferred embodiment of the present invention in use for outside welding of an elongated small diameter workpiece;

Figure 2 is a side elevational view partially in section of the welding jig of Figure 1;

Figure 3 is a front elevational view of the jig as viewed from the left of Figure 2;

Figure 4 is a fragmental elevational view of the work guide roller assembly of Figure 3, omitting the extension portion and coupler for clarity;

Figure 5 is a fragmental detailed view on an enlarged scale of one of the work supporting shafts shown in Figure 3;

Figure 6 is a top plan view of the mounting plate or table for the shaft bearing blocks;

Figure 7 is a front elevational view of the mounting plate or table assembly;

Figure 8 is a perspective view of one of the bearing block pads shown at the left in Figure 7;

Figure 9 is a perspective view of the bearing block pad shown at the right in Figure 7;

Figure 10 is a perspective view of the welding jig mounted on an elevating member and in use for outside welding of a large diameter workpiece;

Figure 11 is a top plan view of a modification of the jig shown in Figures 1–10;

Figure 12 is a top plan view of the support plate of the jig of Figure 11;

Figure 13 is a perspective view showing the jig in use for inside welding.

Figure 14 is a sectional view taken substantially along the line 14—14 of Figure 11; and Figures 15 and 16 are schematic diagrams illustrating the relation of the various elements in an internal and external welding operation, respectively.

Referring now to the drawing and more particularly to Figures 1, 2 and 3 there is shown a preferred embodiment of my novel universal portable welding jig, wherein 20 designates a conventional welding unit mounted on an adjustable support unit 24, suitably secured to platform 26. Welding wire 28 passes from reel 30, rotatably mounted on stationary frame 32, through stationary tubular guide member 34 to stationary welding head 36, which controls the flow of the liquefied wire to the seam to be welded. Bracket 38 mounts glass plate 40, preferably of a dark color, to one side and in overlying relation to welding head 36, to permit observation of the progress of the weld while protecting the operator from the glare of the arc and flying molten metal or sparks. Control button 42 is suitably connected to control box 44 mounted on the upper surface of bracket 43 and permits the operator to control the operation of the welding unit and is preferably also connected to the driving motor of the jig to simultaneously control it.

As best seen in Figures 2 and 3 the novel universal jig of this invention is a portable compact integrated structure comprising a platform or support consisting of four spaced vertical legs 46, preferably of angle iron having horizontal extending feet 48 provided with suitable apertures (not shown) for mounting bolts to permit securing the support to the floor or an elevating mechanism as will be hereinafter explained. Legs 46 are rigidly interconnected at their upper ends by horizontally extending braces 50 while a similar set of horizontally extending braces 52 rigidly fixed to the lower ends of legs 46 in spaced relation to feet 48 form a base or support for a motor assembly generally indicated at 54 and to be described hereinafter.

Plate 56, as illustrated in Figure 6, of relatively thick sheet steel forms the table surface of my novel jig and is provided adjacent one marginal edge with predetermined spaced longitudinally aligned apertures 58, 60 and 62. Similarly spaced apertures 64, 66 and 68 are provided adjacent the opposite marginal edge so that apertures 58 and 64; 60 and 66; and 62 and 68 are in transverse alignment. Threaded apertures 70, 72 and 74 and 76, 78 and 80 are also drilled in plate 56 inboard from opposite marginal edges of the plate and are similarly longitudinally and transversely aligned for a purpose which will appear. Also drilled in plate 56 are a pair of spaced openings 82 and opening 84 spaced from and located on a center line intermediate openings 82. Openings 62, 68 and 82 are preferably countersunk at their upper ends for receiving flat headed machine screws in order to provide no obstruction on the upper surface of plate 56 for a purpose which will become apparent.

Table 56 is mounted on top of horizontally extending braces 50 and is rigidly secured at one end by means of bolts (not shown) passing through apertures 62 and 68 and similarly aligned apertures (not shown) in braces 50. A pair of spacer plates 88 (Figure 8) having spaced apertures 90 are mounted at the other end of plate 56 with their respective apertures 90 in alignment with apertures 58 and 60 on one marginal edge and apertures 64 and 66 along the other marginal edge. Pillow blocks 92 having laterally extending flange portions 94 are mounted in relative spaced alignment on spacers 88 with apertures in the flanges (not shown) in axial alignment with respective apertures 90, 58 and 60, and 90, 64 and 66. Suitable bolts 96 secure the pillow blocks and respective spacer plates in rigid fixed relation to table 56 and braces 50.

Adjustment plate 98 (Figure 9) is provided with aligned apertures 100 and 102 along one marginal edge which are transversely aligned with apertures 104 and 106, respectively, along the opposite marginal edge and is also provided with spaced openings 108 located on a longitudinal center line of the plate in longitudinal spaced relation corresponding to the distance between the respective sets of openings 70—76, 72—78, 74—80. For clearance purposes notch 110 is cut from edge 112 of plate 98, adjacent aperture 100 in longitudinal centered relation to opening 84. The underside of apertures 100, 102, 104 and 106, as viewed in Figure 6, are preferably counter sunk to receive flat headed machine screws to assure a smooth under surface on plate 98 for cooperation with the upper surface of table 56.

Spaced pillow blocks 114, similar to pillow blocks 92 are mounted on adjustment plate 98 in overlying relation to apertures 100 and 102 and 104 and 106 respectively and are rigidly secured thereto by suitable flat headed machine screws extending upwardly from the bottom of adjustment plate 98 and through flanges 116 to threadedly engage nuts 118. Adjustment plate 98 with its assembled pillow blocks is securely mounted on table 56 by suitable bolts passing through openings 108 and a pair of aligned openings in table 56, for example openings 70 and 76. Adjustment plate 98 can be connected to table 56 through any of the pair of transversely aligned holes 70—76, 72—78, and 74—80 to selectively space pillow blocks 114 from pillow blocks 92 for a purpose to be hereinafter described.

It will be seen from Figures 2 and 3 that spacer plates 88 compensate for the thickness of adjustment plate 98 and position pillow blocks 92 away from table 56 a sufficient amount so that the centers of the bearing portions of pillow blocks 92 and 114 are maintained in the same plane.

Drive shaft 120 is rotatably mounted in aligned pillow blocks 92 and extends rearwardly beyond the rear pillow block, or to the right as viewed in Figure 2, a short distance and fixedly mounts a large diameter, driven V-belt pulley 122. Shaft 120 also extends to the left a substantial distance beyond the forward or left pillow block as viewed in Figure 2, for a purpose to be explained. Collars 124 (Figure 3) fixedly secured to shaft 120 for rotation therewith engage the opposite bearing faces of the pillow blocks and act as thrust bearings restraining axial movement of drive shaft 120. Idler shaft 126 is similarly rotatably mounted in spaced pillow blocks 114 and is provided with collars 128, similar to collars 124, engaging opposite faces of the pillow blocks and restraining axial movement of shaft 126. Idler shaft 126 does not extend rearwardly as much as shaft 124 but does extend forwardly or to the left as viewed in Figure 2 the same amount as shaft 124 for a purpose to be described.

Metallic sleeves 130 are mounted on the forward projections of shafts 120 and 126, and are axially located thereon and prevented from moving by abutting engagement at one end with end plates 132 secured to the ends of the shafts by axially extending screws 134 threadedly engaging the shafts, and abutting engagement at the other ends with enlarged abutment rings or collars 136 rigidly secured to the shafts by inwardly extending set screws 138 (Figure 5). If desired, end plates 132 and collars 136 can be integrally formed with sleeve portions 130. As clearly seen in Figure 5, the face of ring 136 adjacent sleeve portion 130 is bevelled at an angle of approximately 50 degrees from the vertical to allow for expansion of the member being welded, as will become apparent.

A channel bracket 140 is secured to the underside of table 56 by means of flat headed machine screws 141 extending downwardly through apertures 82 of plate 56 and rigidly mounts pivot bolt 142 between legs 144 of the channel in parallel relation to the table. Pivot bolt 142 pivotally mounts an axial guide and support or clamp unit generally indicated at 146.

The axial guide and support unit 146, which serves to axially grip the workpiece mounted on the jig for welding, comprises an elongated square sectioned bar 148 pivotally mounted intermediate its ends on pivot bolt 142. An actuating or control rod 150 extends downwardly through aperture 84 of plate 56 and suitably aligned apertures in bar 148 and mounts coil spring 152 thereon between the under surface of table 56 and the top of bar 148 which tends to exert a clockwise rotative force on the bar. Preferably a bearing washer 153 is interposed between spring 152 and the under surface of plate 56. The lower end of control rod 150, as viewed in Figure 2, is threaded to receive nut 154 to prevent the rod from slipping out of the apertures in bar 148. The other end of the rod is rotatably connected as at 155 to flat sided cam 156, which is biased into contact with the upper surface of table 56 by spring 152. Handle 158 rigidly affixed to cam 156 permits selective rotation of the cam to position cam faces 160 or 162 in contact with the upper surface of table 56. When handle 158 is rotated counter clockwise to bring cam face 160 into contact with table 56 control rod 150 is moved upwardly, as viewed in Figure 2, which tends to rotate bar 148 counterclockwise about pivot 142. Positioning of cam face 162 in contact with the table, by clockwise rotation of handle 158, effectively decreases the distance between the table 56 and pivot 155 which permits coil spring 152 to rotate bar 148 in a clockwise direction. The purpose of this functioning of bar 148 will appear in connection with the discussion of operation of the universal jig to be hereinafter described.

As shown in Figure 2, an extension bar 164 similar to bar 148 is coupled thereto by coupling member 166 rigidly secured to extension 164 as by weld 168 and detachably secured to bar 148 as by a plurality of set screws 170. The outer end of extension 164 slidably adjustably mounts the axial guide support workpiece engaging assembly which comprises a channel member 172 having a plate 174 detachably secured at one side thereof to define a square sectioned opening 176 (Figure 1) of slightly smaller size than the outside dimensions of square bar extension 164 or bar 148. Thus once channel member 172 is located in its desired position on extension 164 or bar 148 screws 178 are tightened which causes plate 174 to clampingly engage extension 164 or bar 148 and rigidly hold channel member 172 in its adjusted position.

Support post 180 rigidly affixed to channel member 172 extends upwardly therefrom and is provided with an axially threaded bore for receiving the threaded end of roller shaft 182. Roller 184 is rotatably mounted at the upper end of shaft 182, in bearing contact with collar 186, and is retained thereon by nut 188 threadedly engaging the other end of shaft 182. Roller 184 is vertically adjustable by virtue of the threaded connection between shaft 182 and support 180. Jam nut 190 threadedly mounted on shaft 182 and adapted to wedgingly engage the upper surface of support post 180 retains the shaft in its adjusted position.

Notch 110, heretofore described, is provided in adjustment plate 98 to allow clearance for the reciprocatory action of rod 150 and cam 156 when adjustment plate 98 is secured to table 56 at its innermost position through holes 70 and 76.

In seam welding members such as pipe 192 to flange 194, as shown in Figure 1, flange 194 is first tack welded to pipe section 192 to hold the two members in the desired relation. Handle 158 is rotated counterclockwise which moves cam face 160 into contact with table 56 causing bars 148 and 164 to rotate counterclockwise about pivot 142 to lower roller 184 relative to sleeves 130 out of interfering relation. Flange 194 is mounted over sleeves 130 with its end face in abutting contact with the bevelled face of collar 136, and with pipe section 192, tack welded thereto being axially supported by sleeves 130. The spacing between shafts 120 and 126, as previously pointed out is controlled by the position of adjustment plate 98 on table 56. Plate 98, therefore, is secured to table 56 through the selected pair of holes 70—76, 72—78, or 74—80 to maintain the minimum distance between shafts 120 and 126 commensurate with transverse stability of the supported pipe section 192. The purpose of maintaining a minimum distance between shafts 120 and 126 is to have as small a distance between the chordal line joining the point of contact of the pipe section with the rollers and the periphery of the pipe section toward which the welding electrode is directed for welding. The smaller the distance is commensurate with transverse or lateral stability of the pipe section, the more nearly do the welding conditions approach that of welding flat plates. This is of great importance, since as heretofore noted, the tolerances on the gap between the welding head and workpiece is usually of the order of plus or minus $\frac{1}{64}$ of an inch. The most exacting tolerances in large diameter cylindrical members permit a wide range in diametral tolerances or ovality; for example in a pipe section of approximately 72 inches the most exacting diametrical tolerance allows a vairation of $\frac{9}{16}$ of an inch. Obviously with this degree of ovality in the member to be welded control of the welding head within the allowed tolerance for efficient welding has heretofore been practically impossible. By providing the novel adjustment for spacing shafts 120 and 126 and mounting welding head 36 immediately over the supported section, the novel jig of this invention provides a set up for circumferential welding more nearly approaching the easily controlled efficient weld conditions existent in flat plate welding. A clearer understanding of the foregoing will be had from reference to Figures 15 and 16 schematically showing the novel jig of this invention adapted for an internal and external weld respectively. By properly controlling the distance D between centers of shafts 120 and 126, by adjustment of plate 98, the minimum rise or drop $e$ between the chordal line C and the periphery P to be welded commensurate with lateral stability of pipe section 192 can be obtained. The smaller the value of $e$ the more nearly does the section between shafts 120 and 126 approach that of a flat plate and the more easily can the tolerance T between the welding head 36 and periphery P be controlled. Additionally, supporting the section to be welded immediately adjacent the welding head rather than on centers or at the diametrically opposite portion, as in prior art devices, lessens the effect of ovality in the pipe on the welding tolerances, since the small radii increment $e$, rather than the full radius or diameter, controls the path of rotation of the section being welded and is substantially self compensating insofar as variations due to ovality are concerned. Therefore, by providing the aforementioned novel relation of adjustable shafts 120 and 126 and their supporting contact with the workpiece, the shafts can be preadjusted to give the optimum conditions of maximum stability with a minimum spacing between rollers which permits the conditions of circumferential welding with this novel universal jig to approach that of flat plate welding, with the consequent results of better control, and a more efficient weld. After the members to be welded are properly mounted on my improved support, welding unit 20 is easily adjusted into position immediately over the supported section of the seam to be welded with the proper tolerance clearance between the seam and welding head by virtue of the conventional adjustable welding unit support 24 shown in Figure 1.

As shown in Figure 1 the novel jig of this invention is used for supporting a relatively small diameter workpiece for an external circumferential seam weld operation. However, the novel jig is universal in use and is equally adaptable for providing support during an internal circumferential welding operation, as illustrated in Figure 13, on even substantially larger diameter workpieces.

For purposes of illustrating the universality of the novel jig of this invention, Figure 13 illustrates an internal welding operation of a large diameter narrow ring member. For welding narrow members extension 164 is disconnected from bar 148 and channel bracket 172 is directly mounted on bar 148, and adjustably set at the desired position according to the axial length of the member to be welded to permit roller 184 to engage the end of member to be welded. Handle 158 is rotated counterclockwise to effectively lower or rotate roller 184 and its associated assembly in a counterclockwise direction out of the way and facilitate mounting of the member to be welded. Pillow blocks 114 are then adjusted by repositioning of plate 98 to get the proper spacing between shafts 120 and 126 which will give the optimum conditions of maximum stability and proper tolerance relation between the members being welded and the welding head thus eliminating a bad weld because of ovality or out of roundness in the members. In the case of large diameter members, a tripod 196 is suitably rigidly secured on top of table 56 by any suitable means (not shown) and adjustably slidably supports vertical shaft 198 in hollow cylindrical bearing member 200. A bracket 202, adjustably mounting spaced opposed roller brackets 204 by suitable means (not shown), is rigidly secured to the upper end of shaft 198. Rollers 206 are rotatably mounted in bracket members 204 to provide axial stability to the member being welded. After shafts 120 and 126 have been properly adjusted to the best operating conditions large diameter member, indicated at 208, is placed between rollers 206 and supported on sleeves 130, covering shafts 120 and 126. Vertical shaft 198 is adjusted so that there is slight clearance between the inner periphery of members 208 and the upper surface of bracket 202 and locked in position by set screw 210 threaded in cylinder 200. Roller brackets 204 are also adjusted to bring the rollers into proper bearing contact with opposite faces of member 208. Roller 184 which has been previously adjusted to the dimensional thickness or axial length of the members is then brought into contact with the adjacent face of the members by clockwise rotation of handle 158 thereby resiliently clamping members 208 between roller 184 and collars 136. Welding unit 20 is then easily adjusted to position welding head 36 within the inner periphery of members 208 over the seam to be welded. In this connection, the schematic showing of Figure 15 is relevant.

The jig, in either use described, provides the power for advancing the work piece past the welding head. To this end a power unit generally indicated at 54 is supported beneath table 56 on a pair of parallel braces 214 rigidly secured to opposite parallel braces 52. Two pairs of axially aligned pillow blocks 216 are rigidly mounted in parallel relation on braces 214 as by bolts 218 and supportingly receive guide rods 220 therein.

A pair of integral, laterally extending bearing members 222 support the opposite sides of a platform 224 and are slidably mounted on respective rods 220 forming a slidable carriage for motor gear box 226. Flange 228 rigidly secured to a brace 214 between a pair of spaced pillow blocks 216, mounted on the same brace, rotatably mounts threaded carriage feed shaft 230 which threadedly engages flanges 232 connecting transverse pairs of bearings 222, as clearly seen in Figure 2. Axial movement of feed shaft 230 is prevented by integral shoulder 234 abutting one side of flange 228 and by a face of boss 236 of rigidly mounted control handle 238 abutting the opposite face of flange 228. Gear box 226 rigidly secured to platform 224 rotatably mounts shaft 240 therein, which is drivingly connected to electric motor 242, rigidly affixed to the outside of gear box 226, by suitable means such as a worm and worm wheel connection (not shown). Shaft 240 extends exteriorly of gear box 226, to the right as viewed in Figure 2 beyond legs 46 and rigidly mounts variable speed V-belt pulley 244, for rotation therewtih. Pulley 244 may be of any conventional variable speed type but as illustrated takes the form wherein one side is resiliently biased toward the other and will upon rotation of carriage feed shaft 230 to vary the distance between the V-drive belt 246 shift the driving engagement between the belt and pulley 244 to varying radial distances in well known manner thus forming a variable speed drive. Belt 246 is mounted on pulleys 122 and 244 and forms the driving connection between shaft 240 and workpiece drive shaft 120. Platform 224 can be moved between the two positions shown in full and phantom lines in Figure 3 to effect the speed adjustments. In the position shown in full lines V-belt 246 will ride at the outer periphery of pulley 244 thereby decreasing the ratio between shafts 120 and 240 and driving shaft 120 at a relative fast speed. Movement of platform 224 to the position shown by phantom lines in Figure 3 will force the belt toward the center of pulley 244, separating the sides of pulley 244 and will increase the ratio between shafts 120 and 240 thereby driving shaft 120 at a much slower speed. By virtue of the threaded feed shaft 230 there is provided micro-adjustment whereby any desired speed ratio between the two conditions illustrated in Figure 3 is easily attainable.

It will thus be seen that rotation of shaft 240 is transmitted to shaft 120 which then imparts rotation to pipe section 192 and flange 194, which has been previously secured to the pipe section by preparatory tack welds, due to the driving clamping of the workpiece against collar 136 and its frictional contact with sleeve 130 to progressively move the seam to be welded past welding head 36.

It should be emphasized at this point that the position of welding head 36 in relation to both the seam to be welded and the support shafts 120 and 126 is important. The positioning should be such that the rotational speed and direction of rotation of pipe section 192 is just sufficient to assure proper heating of the work pieces and overcome the force of gravity acting on the weld puddle to assure a fixed relation between the puddle and seam until the puddle solidifies.

By way of illustration and referring ot Figure 1, assuming the direction of rotation of pipe section 192 to be as indicated by the solid arrow, then weld head 36 should be positioned toward shaft 120 or the left hand shaft as viewed in Figure 1. In this illustration the weld puddle will be formed at a point along the periphery slightly to the left of the vertical longitudinal center of pipe section 192 and the rotation will be clockwise against the pull of gravity, indicated by the broken arrow. By proper control of the speed of rotation, piling up of the weld puddle or a tendency for it to run counterclockwise along the seam will be prevented to thus more nearly simulating a flat surface welding operation. The positioning of welding head 36 as near as possible to one of the support rollers or shafts, in this example shaft 120, also approaches the most desirable conditions of reducing the effects of ovality in the members, heretofore described.

Turning now to Figures 11, 12 and 14 there is shown a further embodiment of the novel universal portable jig wherein there is provided a novel axial support and clamping means generally indicated at 248 which finds particular utility when welding members have irregular axial lengths.

In this embodiment, a modified table or upper surface plate 250 (Figure 12) is provided with four spaced holes 252 which take the place of holes 82 and 84 in table 56, and which serve to rigidly mount spaced bracket members 254 as by bolts 256. A fluid cylinder 258 is rigidly mounted between brackets 254 as by longitudinally extending bolts 260 with its longitudinal axis parallel to and in the same horizontal plane as the axis of shafts 120 and 126. Axially extending reciprocable rod 262 operatively connected at one end to a reciprocable piston (not shown) within cylinder 258 is threaded at the other end for coupling engagement with threaded extension 264 by means of nut type coupler 266. A pair of spaced flanges 268 rigidly secured to table 250 extend angularly upwardly beneath rod 262 and serve to mount guide or fulcrum rod 270 to the right of and in the same plane as rod 262, as clearly seen in Figure 11. Hollow spacer bushing 272 mounted on guide rod 270 between the flanges serves to maintain the flanges in unbending spaced relation. Nuts 274 threadedly mounted on rod 270 and engaging the outermost faces of the flanges serve to rigidly secure rod 270 in flanges 268. As clearly seen in Figure 11, shaft 126 mounts roller sleeve 130 and abutment collar 136 as in the case of the embodiment shown in Figures 1 and 2. Shaft 120, however, merely mounts a collar 276 rigidly secured to the shaft and having an axially extending short sleeve portion 278 of the same diameter as sleeve 130. An axially slidable clamp collar 280 having a sleeve portion 282 extending toward sleeve portion 278 and of the same diameter as sleeve 130 is mounted on shaft 120. Clamp collar actuating lever 284 is mounted on both rod extension 264 and rod 270 by means of elliptical holes 286 with bifurcated arms 288 (Figure 14) in partial surrounding relation to shaft 120, to permit axially extending projections 290 on the arms to bearingly contact ring portion 292 of collar 280. A pair of nuts 294 having opposed rounded end faces are threadedly mounted on extension 264 on opposite sides of lever 284 and serve to impart movement of extension 264 to the lever, as will become apparent. A pair of nuts 296 are also threadedly mounted on rod 270 on opposite sides and in spaced relation to lever 284 for a purpose which will also become apparent.

In the operation of the embodiment shown in Figure 11, shaft 126 is adjusted to the optimum spacing condition relative to shaft 120 as heretofore described. A workpiece to be welded is then mounted on sleeve 130 and on sleeve portions 278 and 282 between collars 276 and 280. Cylinder 258 is then evacuated drawing the piston therein and extension 264 inwardly, as viewed in Figure 11 clamping the workpiece between collars 276 and 280. Welding head 36 is then positioned relative to the seam to be welded and motor 242 is started to impart rotation to shaft 120 and the workpiece supported thereon. In the event of any axial irregularities or expansion due to the welding heat in the workpiece, the novel fluid actuated clamp will automatically compensate for them without disturbing the position of the seam being welded. For example, with reference to Figure 11, assuming there is an increase in axial length of the workpiece from one point to another, then collar 280 will be forced outwardly pulling extension 264, outwardly against the evacuating force induced in the cylinder. If the axial length suddenly decreases extension 264 will be pulled inwardly by the evacuating force in the cylinder, maintaining the clamp firmly against the end of the workpiece. In order to eliminate undue strain on lever 284 nuts 294 in contact with the lever are rounded, as heretofore described, and nuts 296 are spaced from the lever to permit a fulcruming action of the lever on rod 270 as allowed by elliptical openings 286. The clamp collar assembly 280 is free to rotate on shaft 120 during rotation of shaft 120 relative to projections 290, to thereby reduce the frictional engagement of collar 280 with the end of the workpiece.

Referring now to Figure 10, there is shown an installation of the novel universal portable jig which permits ready adaptation of the jig for supporting the largest possible workpiece and emphasizes the wide range of different workpiece sizes supportable by the jig for either internal or external seam welding. As illustrated, the jig is shown with the novel fluid clamping arrangement shown in Figure 11. It is to be understood, however, that the form of jig illustrated in Figures 1–9 may be similarly used.

Vertically spaced legs 46 are rigidly secured to spaced I-beams 298 suitably secured to a hoist platform 300 mounted on top of hydraulic lift 302. Hydraulic lift 302 is of the conventional service station type and is easily raised and lowered in well known manner to position the portable jig at the proper level for various sized workpieces. In Figure 10, the hydraulic lift is shown elevated to permit mounting a large diameter workpiece 304, for example a 10 foot diameter bellows fitting, on the jig for an external seam weld. Spaced guide blocks 306 placed on the floor in engaging relation with the lower end of workpiece 304 prevent any axial swaying of the workpiece. Of course, it is to be understood that roller bearing guides or other suitable floor guides other than those illustrated may be employed. A platform 308 may be suitably secured to one side of legs 46 to provide means for an operator to stand, to observe the progress of and control the welding operation.

It should also be noted that if it is desired to reduce the speed at which the member to be welded is being rotated past the welding head below that available through adjustment of the novel variable drive connection then sleeves 130 can be removed from shafts 120 and 126 to reduce the driving diameter of the supports and thereby further reduce the linear speed of feed shaft 120.

From the foregoing it will be readily seen that the present invention provides a novel, inexpensive and compact universal portable jig for drivingly supporting cylindrical members for either internal or external welding operations regardless of size and which novelly provides complete control of the workpiece and properly supports the workpiece in relation to the welder head for efficient welding.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A universal jig for supporting substantially cylindrical members for circumferential internal or external welding operations comprising, a compact stand; a welding head adjustably mounted on said stand; respectively laterally adjustable, axially elongated, rotatable support means having adjacent ends journalled on said stand and their support portions projecting away from an end of said stand in spaced parallel relation for selectively, supportingly engaging the inner or outer peripheries of a laterally curved member to be welded along laterally spaced longitudinal areas closely adjacent and at opposite sides of said welding head; means for adjusting said support means laterally to engage said member to be welded in a manner to insure stability of said member on said support means and a minimum distance between said spaced points whereby the subtended circumference of said member lies substantially in a chordal plane through said spaced points to present a substantially flat surface to said welding head thereby minimizing the effects of ovality in said member; and power means mounted on said stand for driving said support means to rotate said member at controlled speed past said welding head to permit progressive welding of said member.

2. A universal welding jig for supporting substantially cylindrical members for circumferential internal or external welding operations comprising, a compact stand; a welding head adjustably mounted on said stand; respectively laterally adjustable, axially elongated, spaced rotatable supports having adjacent ends journalled on said stand and projecting from an end thereof for selectively, supportingly engaging the inner or outer peripheries of a laterally curved member to be welded along laterally spaced longitudinal areas closely adjacent and at opposite sides of said welding head; means for adjusting at least one of said supports laterally to insure stability of said member on said supports and a minimum distance between said spaced points whereby the subtended circumference of said member lies substantially in a chordal plane through said spaced points to present a substantially flat surface to said welding head thereby minimizing the effects of ovality in said member; and power means mounted on said stand for driving at least one of said supports to rotate said member at controlled speed past said welding head to permit progressive welding of said member.

3. A universal jig for supporting substantially cylindrical tubular members for circumferential internal or external welding operations comprising a compact stand; a welding head adjustably mounted on said stand; respectively laterally adjustable, axially elongated, rotatable supports means having adjacent ends journalled on said stand and projecting from an end thereof for selectively supportingly engaging the inner or outer periphery of a lateraly curved member; member to be welded along laterally spaced longitudinal areas closely adjacent and at opposite sides of said welding head to support said member in predetermined minimum spaced relation to said welding head positioned adjacent the periphery of the supported portion of said member opposite said support means; means for laterally adjusting said support means to engage said member to be welded in a manner to insure stability of said member on said support means and a minimum of distance between said spaced points whereby the circumference of said member between said points presents a substantially flat surface to the welding head thereby minimizing the effects of ovality in said member; and power means mounted on said stand for driving said support means to rotate said member at controlled speed past said welding head to permit progressive welding of said member.

4. A portable universal welding jig for supporting substantially cylindrical hollow members for circumferential internal or external welding operations comprising, a portable compact stand; a welding head adjustably mounted on said stand; respectively laterally adjustable, axially elongated, rotatable support means comprising a pair of spaced supports rotatably mounted on said stand and projecting from an end thereof for selectively supportingly engaging the inner or outer periphery of a member to be welded along laterally spaced longitudinal areas closely adjacent and at opposite sides of said welding head; means for selectively laterally adjusting at least one of said supports to engage said member to be welded in a manner to insure stability of said member on said supports and a minimum distance between said spaced points whereby the subtended circumference of said member lies substantially in a chordal plane through said spaced points to present a substantially flat surface to said welding head thereby minimizing the effects of ovality in said member; power means mounted on said stand for driving at least one of said supports to rotate said member at controlled speed past said welding head to permit progressive welding of said member; and selectively variable drive means between said power means and said one of said supports for varying the speed of said one support to rotate said member at a predetermined linear speed for efficient progressive welding.

5. A universal jig for supporting substantially cylindrical members for circumferential internal or external welding operations comprising, a compact stand; a welding head adjustably mounted on said stand; respectively laterally adjustable, axially elongated, rotatable support means having adjacent ends journalled on said stand and their support portions projecting away from an end of said stand in spaced parallel relation for selectively supportingly engaging the inner or outer peripheries of a laterally curved member to be welded at circumferentially spaced points to maintain the linear section of said member adjacent said welding head in predetermined spaced relation to the welding head; collar means on said support means adjacent said stand abuttingly engaging one end of said member to be welded; clamp means operatively mounted on said stand and adapted to engage the other end of said member to maintain said member in predetermined axial position on said support means with its one end against said collar means whereby axial bodily movement of said member relative to said welding head is prevented to thereby assure proper depositing of a weld on said member; and power means mounted on said stand for driving said support means to rotate said member at controlled speed past said welding head to permit progressive welding of said member.

6. A universal jig for supporting substantially tubular members for circumferential internal or external welding operations comprising, a compact stand; a welding head adjustably mounted on said stand; respectively laterally adjustable, axially elongated, rotatable support means mounted on said stand and projecting from an end thereof for selectively supportingly engaging the inner or outer peripheries of a member to be welded along laterally spaced longitudinal areas closely adjacent and at opposite sides of said welding head thereby supporting said member by engagement with one of said peripheries with a linear section of minimum length disposed in predetermined spaced relation to said welding head positioned adjacent the periphery of the supported portion of said member opposite said support means whereby said member is supported in the vicinity of the weld to thereby minimize the effects of ovality in said member; guide means operatively connected to said stand and having a portion adapted to engage an end of said member to maintain said member in predetermined axial position on said support means whereby axial bodily movement of said member relative to said welding head is prevented thereby assuring proper depositing of a weld on said member; and power means mounted on said stand for driving said support means to rotate said member at controlled speed past said welding head to permit progressive welding of said member.

7. A portable universal jig for supporting substantially cylindrical hollow members for circumferential internal or external welding operations comprising, a compact portable stand; a welding head adjustably mounted on said stand; respectively laterally adjustable, axially elongated, rotatable support means mounted on said stand and projecting from an end thereof for selectively supportingly engaging an inner or outer periphery of a member to be welded adjacent to and at opposite sides of said welding head to maintain said member in predetermined spaced relation to the welding head; guide means operatively connected to said stand and selectively axially movable into and out of engagement with an end of said member to alternately yieldingly clamp said member in a predetermined axial position on said support means to prevent axial bodily movement of said member relative to said welding head and thereby assure accurate location of a weld on said member and release said member; means for moving said axial guide means to and from operative clamping engagement with said member to be welded; and power means mounted on said stand for driving said support means to rotate said member at controlled speed past said welding head to permit progressive welding of said member.

8. A portable universal jig for supporting substantially cylindrical hollow members for circumferential internal or external welding operations comprising a compact portable stand; rotatable support means mounted on said stand for longitudinally engaging a periphery of a member to be welded adjacent to a welding head; axial guide means comprising a rod pivotally mounted on said stand, a bearing member adjustably mounted along said rod and selectively movable into and out of operative engagement with an end of said member to alternately selectively yieldingly clamp said member in predetermined axial position on said support means and release said member whereby axial bodily movement of said member relative to said welding head is effectively prevented when said member is clamped to thereby assure accurate location of a weld on said member, means for yieldingly biasing said bearing member into contact with the end of said member to be welded whereby variations of axial length of said member to be welded are compensated for by yielding movement of said bearing member and release means for moving said bearing member out of contact with the end of said member to be welded to permit removal of said member from said support means; means for moving said axial guide means to and from operative clamping engagement with said member to be welded; and power means mounted on said stand for driving said support means to rotate said member to be welded at controlled speed past said welding head to permit progressive welding of said member.

9. A portable universal jig for supporting substantially cylindrical hollow members for circumferential internal or external welding operations comprising a compact portable stand; rotatable support means mounted on said stand for longitudinally engaging a periphery of a member to be welded adjacent to a welding head to maintain said member in predetermined spaced relation to the welding head; axial guide means comprising fluid actuated means responsive to variations in the axial length of said member to be welded operatively connected to said stand and selectively movable into and out of engagement with an end of said member to alternately selectively yieldingly axially clamp said member in predetermined axial position on said support means and release said member whereby axial variations in said member are compensated for by movement of said fluid actuated means while said member to be welded is prevented from axial bodily movement relative to said welding head when said member is clamped to thereby assure proper, accurate location of a weld on said member; means for moving said axial guide means to and from operative clamping engagement with said member to be welded; and power means mounted on said stand for driving said support means to rotate said member to be welded at controlled speed past said welding head to permit progressive welding of said member.

10. A portable universal jig for supporting substantially cylindrical hollow members for circumferential internal or external welding operations comprising a compact portable stand; rotatable support means mounted on said stand for longitudinally engaging a periphery of a member to be welded adjacent to a welding head to maintain said member in predetermined spaced relation to the welding head; axial guide means operatively connected to said stand and comprising a collar axially slidably mounted on one of said supports for selective movement into and out of engagement with an end of said member to be welded to alternately yieldingly clamp said member to be welded in a predetermined axial position on said support means and release said member, a fluid motor mounted on said stand, an extension operatively connected to said fluid motor for reciprocation relative to said supports, means providing a connection between said collar and extension, and means for creating a pressure differential in said motor to draw said collar into engagement against the end of said member to be welded whereby variations in axial length of said member to be welded will be compensated for by reciprocation of said collar on said support and axial bodily movement of said member relative to said welding head is effectively prevented when said member is clamped to thereby assure accurate location of a weld on said member; means for moving said axial guide means to and from operative clamping engagement with said member to be welded; and power means mounted on said stand for driving said support means to rotate said member at controlled speed past said welding head to permit progressive welding of said member.

11. The device as set forth in claim 7 wherein said axial guide means comprises spring biased means responsive to variations in the axial length of said member to be welded to yieldingly axially clamp said member on said support means whereby axial variations in said member are compensated by pivotal movement of said spring biased means while said member to be welded is prevented from axial bodily movement relative to said welding head to assure proper location of a weld.

12. A universal welding jig for supporting substantially cylindrical members for circumferential internal or external welding operations comprising, a compact stand; a welding head adjustably mounted on said stand; respectively laterally adjustable, axially elongated, spaced rotatable supports having adjacent ends mounted on said stand and projecting from an end thereof for selectively supportingly engaging a periphery of a laterally curved member to be welded along laterally spaced longitudinal areas closely adjacent and at opposite sides of said welding head to maintain a predetermined circumferential portion of said member in predetermined spaced relation to said welding head adjacent said supports; means for laterally adjusting said supports to minimize the spacing therebetween while insuring stability of said member on said supports; abutment means on said supports for engaging one end of said member to axially locate said member on the supports; axial guide means operatively connected to said stand intermediate said supports and adapted to engage the other end of said member to yieldingly clamp said member between said abutment means and said axial guide means in a manner to assure axial stability of said member on the supports whereby axial movement of said member relative to said welding head is prevented thereby assuring proper location of said weld; and power means mounted on said stand for driving one of said supports to rotate said member at controlled speed past said welding head to permit progressive annular welding of said member.

13. A portable universal welding jig for supporting substantially cylindrical hollow members for circumferential internal or external welding operations comprising, a portable compact stand; a welding head adjustably mounted on said stand; respectively laterally adjustable, axially elongated, spaced supports having adjacent ends rotatably mounted on said stand for selectively supportingly engaging a periphery of a laterally curved member to be welded along laterally spaced longitudinal areas closely adjacent and at opposite sides of said welding head; means for selectively laterally adjusting at least one of said supports with respect to each other to engage said member to be welded in a manner to insure stability of said member on said supports and a minimum distance between said spaced support points whereby the subtended circumference of said members lies substantially in a chordal plane through said spaced support points to present a substantially flat surface to a welding head thereby minimizing the effects of ovality in said member; a motor adjustably mounted on said stand for driving at least one of said supports to rotate said member past said welding head to permit progressive welding of said member; and variable drive means operatively connecting said motor and said one support responsive to adjustment of said motor to vary the speed ratio between said motor and support whereby said member can be driven at selective speeds.

14. The device as set forth in claim 13 wherein the adjustable mount for said motor comprises guide means mounted on said stand; a movable platform for said motor mounted for selective movement on said guide means; and selectively movable feed means mounted on said stand and operatively connected to said platform whereby selective movement of said feed means selectively positions said platform and motor to vary the drive ratio between said motor and said one support.

15. The device as set forth in claim 14 wherein said feed means comprises a threaded shaft rotatably mounted on said stand and threadedly engaging said platform whereby rotation of said threaded shaft causes said platform to be moved relative to said guide means.

16. The device as set forth in claim 13 wherein said variable drive means comprises a driven pulley operatively connected to one of said supports; a driving belt mounted on said pulley; and a variable drive pulley operatively drivingly connected to said motor and movable therewith to operatively engage said belt and responsive to tension in said belt to automatically vary the radial area of engagement of said pulley by said belt whereby adjustable movement of said motor selectively tensions said belt to vary the drive ratio between said drive and driven pulleys.

17. A universal jig for supporting substantially cylindrical hollow members for circumferential internal or external welding operations comprising, a compact portable stand; a welding head adjustably mounted on said stand; respectively laterally adjustable, axially aligned, rotatable support means relatively movably mounted on said stand with their support portions projecting away from an end of said stand in spaced parallel relation for selectively drivingly and supportingly engaging at laterally spaced points closely adjacent its periphery and at opposite sides of said welding head a member to be welded; means for adjusting said support means to vary the lateral spacing between said support points and engage said member to be welded in a manner to insure stability of said member on said support means and a minimum distance between said spaced points whereby the subtended circumference of said member lies substantially in a chordal plane through said spaced points to present a substantially flat surface to a welding head positioned adjacent said support means thereby minimizing the effects of ovality in said member; guide means engaging the opposite ends of the subtended circumference of said member to yieldingly retain said member on said support means; auxiliary guide means detachably secured to said stand and engaging at least one end of said member at a point diametrically opposed to said supports for imparting axial stability to said member; and power means mounted on said stand for driving said support means to rotate said member at controlled speed past said welding head to permit progressive welding of said member.

18. In combination a universal welding jig adapted to selectively support a wide range of different diametered substantially cylindrical members for circumferential internal or external welding operations and comprising a compact portable stand; a welding head adjustably mounted on said stand; respectively laterally adjustable, axially elongated, rotatable support means mounted on said stand with support portions projecting away from an end of said stand for selectively supportingly engaging a periphery of a curved member to be welded at spaced points closely adjacent and at opposite sides of said welding head; means for adjusting said support means to vary the lateral spacing between said support points and engage said member to be welded in a manner to insure stability of said member on said support means and a minimum distance between said spaced points whereby the subtended periphery of said member lies substantial in a chordal plane through said spaced points to present a substantially flat surface to a welding head positioned immediately adjacent said support means to thereby minimize the effects of ovality in said member, power means mounted on said stand for driving said support means to rotate said member at controlled speed past said welding head to permit progressive welding of said member; and elevator means supporting said stand for raising and lowering said stand with its supported jig and welding head to selected vertical positions whereby said jig may be positioned in a suitable elevated position to accommodate in pendant relation a selected one of said different diametered members to be welded including members of a diameter large enough to extend below the support surface of said elevator means.

19. A universal jig for supporting substantially cylindrical tubular members for circumferential internal or external seam welding operations comprising a compact stand; a welding head adjustably mounted on said stand; respectively laterally adjustable, axially elongated, rotatable support means laterally movably mounted on said stand with their support portions projecting from an end of said stand in spaced parallel relation for selectively drivingly supportingly engaging a laterally curved member to be welded at closely spaced circumferential points at opposite sides of said welding head thereby subtending an arcuate portion of said member having a minimum convexity to a chordal plane through said spaced points to assure a minimum variation of the distance between said arcuate portion and said welding head disposed in predetermined spaced relation thereto in the median plane normal to said chordal plane and in proper aimed relation to a circumferential seam to be welded; and variable speed drive means drivingly connected to said rotatable support means and arranged to drive said support means at predetermined speed in a direction to overcome the gravitational flow along said seam of a welding puddle deposited on said arcuate portion.

20. The combination defined in claim 18 together with yielding guide means mounted on said stand and arranged to engage an end face of said member to be welded to yieldingly retain said member against axial shifting movement on said support means to maintain said seam against transverse displacement with respect to said aimed welding head.

References Cited in the file of this patent

UNITED STATES PATENTS

| Number | Name | Date |
|---|---|---|
| 1,499,499 | Bienenstock | July 1, 1924 |
| 1,550,651 | Charter | Aug. 18, 1925 |
| 1,552,248 | Tobey | Sept. 1, 1925 |
| 1,601,928 | Tobey | Oct. 5, 1926 |
| 1,638,024 | Woodrow | Aug. 9, 1927 |
| 1,668,783 | Rupley | May 8, 1928 |
| 1,820,139 | Hume | Aug. 25, 1931 |
| 1,852,781 | Hume | Apr. 5, 1932 |
| 1,910,259 | Raymond | May 23, 1933 |
| 1,962,297 | Candy | June 12, 1934 |
| 1,972,029 | Norquist | Aug. 28, 1934 |
| 2,016,043 | Lincoln | Oct. 1, 1935 |
| 2,135,129 | Trainer | Nov. 1, 1938 |
| 2,153,785 | Williams | Apr. 11, 1939 |
| 2,256,879 | Cornell | Sept. 23, 1941 |
| 2,349,865 | Hawk | May 30, 1944 |
| 2,474,534 | Knost | June 28, 1949 |
| 2,630,514 | Schaefer | Nov. 3, 1953 |
| 2,664,843 | Turner | Jan. 5, 1954 |
| 2,695,942 | Darner | Nov. 30, 1954 |